1

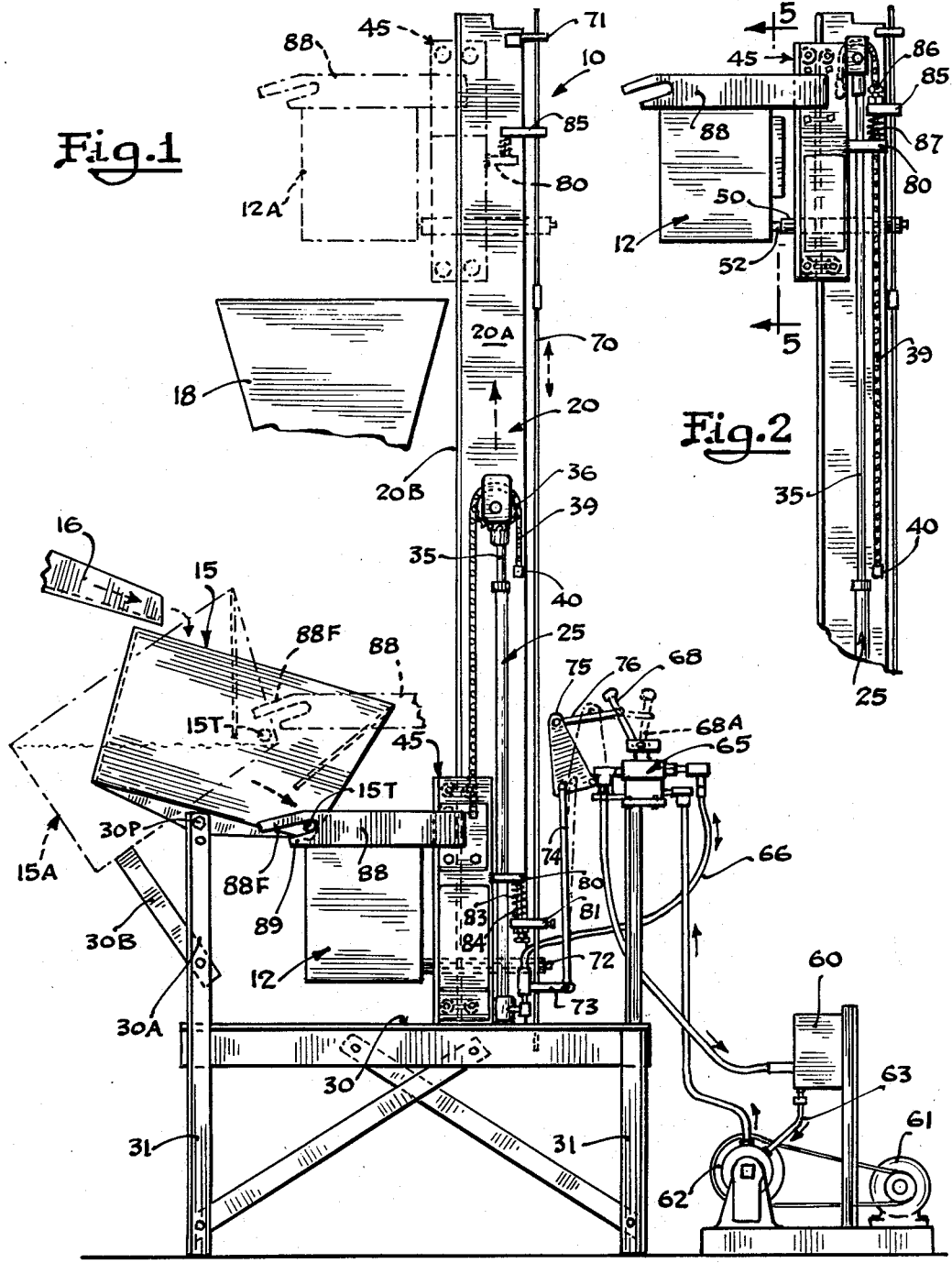

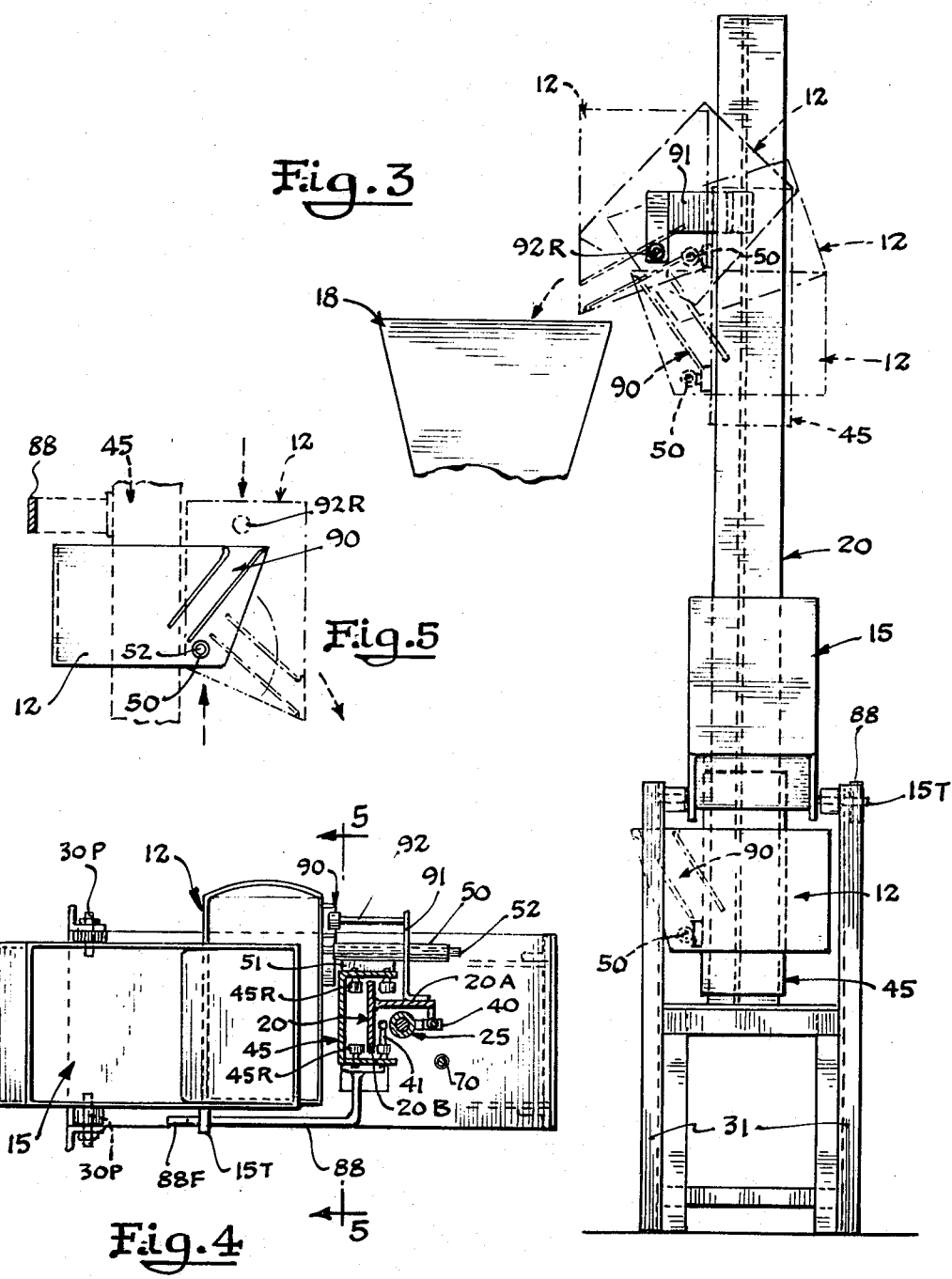

3,499,564
HOIST AND CONTROL MECHANISM FOR
A HOPPER
Fred P. Hopfeld, Elmwood Park, Ill., assignor to Grand
Specialties Company, Chicago, Ill., a corporation of
Illinois
Filed Sept. 18, 1967, Ser. No. 668,333
Int. Cl. B65g 47/40
U.S. Cl. 214—627   1 Claim

ABSTRACT OF THE DISCLOSURE

Movement of materials in process is facilitated by a transport support which moves between a loading station and an unloading station, and as the support arrives at each station a control is actuated resulting in reverse movement of the transport to the other station, virtually instantaneously. At the loading station the transport itself is effective to tilt a hopper causing the materials in process to be transferred from the hopper to the transport support, and as the transport support arrives at the unloading station it is tilted or dumped to transfer the materials to a receiver, the arrangement being such that the loading and unloading functions are repeatedly cycled.

---

This invention relates to materials handling apparatus.

In the processing of ball bearings, small castings, consumer goods and the like, these materials while in process frequently entail operations at stations spaced one from another by a significant dimension, requiring the materials to be transferred en masse between stations, particularly in the instance of items which may have a maximum dimension of only a fraction of an inch. While this can be done manually, the primary object of the present invention is to accelerate transfer of the materials by moving a transfer support repeatedly between stations, the support being automatically loaded at one station and unloaded at the other. More specifically, an object of the present invention is to so relate a transfer support to a loading hopper at a loading station and a discharge chute at an unloading station as to automatically and respectively load and unload the transport at the two stations while interposing a control mechanism operated directly by the transport support in such fashion as to establish reverse movement or travel of the transport support as an incident to the latter arriving at either station. A related object of the present invention is to accomplish the foregoing at minimum cost.

Other and further objects of the present invention will be apparent from the following description and claim and are illustrated in the accompanying drawings which, by way of illustration, show a preferred embodiment of the present invention and the principle thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 1 is a side elevation of apparatus constructed in accordance with the present invention;

FIG. 2 is a fragmentary elevational view similar to FIG. 1;

FIG. 3 is an end elevation of the structure shown in FIG. 1;

FIG. 4 is a top plan view, partly in section, of the structure illustrated in FIG. 1; and FIG. 5 is a fragmentary detail view.

The materials handling equipment 10 of the present invention, FIG. 1, includes a transport support in the form of a hopper 12 which moves vertically between a loading position at a loading station, illustrated in full lines in FIG. 1, and an unloading or discharge postion 12A at a discharge or unloading station, FIG. 1. In the loading position, the hopper 12 is itself effective to tilt a loading member in the form of a bin 15 so that ball bearings or the like contained in the loading member are discharged by gravity into the transport hopper. In the course of moving upward to the discharge or unloading position, the hopper 12 is effective to tilt the loading bin to the reverse position 15A, FIG. 1, so that the latter may be re-filled by means of a loading chute 16. In the course of arriving at the discharge station, the transfer hopper is itself tilted, FIG. 3, so that the material contained therein transfers to a discharge member in the form of a discharge chute 18.

The transfer hopper is supported for vertical movement relative to a stationary support or upright 20 in a manner to be explained, and movement of the hopper 12 between the two stations referred to above is under control of a hydraulic cylinder 25. The transfer hopper is repeatedly cycled between the stations; and as an incident to arriving at one station control means are actuated which cause the cylinder 25 to establish reverse movement of the transfer support to the opposite station.

The mainstay or stationary support 20, FIG. 1, is constructed from a pair of elongated flat plates 20A and 20B secured to one another, as by welding, substantially in a T-shaped arrangement viewed in cross-section as shown in FIG. 4. The plates 20A and 20B are in turn secured, as by welding at the lower ends, to the upper surface of a table 30, FIG. 1, having braced legs arranged for floor mounting.

The cylinder 25 is oriented vertically as will be apparent in FIG. 1, and is nested within the plates 20A and 20B which afford the upright support 20. The lower end of the cylinder 25 is stably supported on top of the table 30 as by welding, and the cylinder presents a vertically movable piston 35 for regulating movement of the transport support 12 between the loading and unloading stations. Preferably this is done by equipping the piston 35 with a sprocket 36 at the upper end thereof, FIG. 1. A chain 39 is anchored at one end to a lug 40 in turn secured by a weldment to the inside of the aft plate 20A. The opposite end of the chain is secured to a like lug or finger 41, FIG. 4, in turn anchored to a slide 45 which serves to transmit motion of the piston to the transfer support 12.

The slide 45, as shown in FIG. 4, fits around the fore plate 20B of the upright or mast 20 and preferably the slide 45 is equipped with pin-mounted rollers 45R, FIG. 4, so spaced and related as to run along the opposite fore and aft sides of the upright plate 20B. In this manner, the slide 45 is stabilized by the rollers for vertical travel and free running thereof is assured with respect to the plate 20B.

The slide 45 supports the transfer hopper 12. To this end, a sleeve 50 is welded to a plate 51, FIG. 4, in turn welded to one side of the slide 45. A pin 52 is secured to the rear of the hopper 12 and is received in the tube 50. Hence, it will be seen that when vertical motion is imparted to the piston 35, FIG. 1, the chain 39 is accordingly tensioned, resulting in elevation of the slide 45, and of course the slide 45 is effective to drive the hopper 12 upwardly.

Extension or advancing movement of the piston 35, characterized by upward movement of the support hopper 12, is accomplished by delivering hydraulic fluid under pressure to the lower end of the cylinder 25; and when the transfer hopper 12 is to be lowered from the unloading station to the loading station, hydraulic fluid in the cylinder 25 in effect is drained to a reservoir so that the hopper 12 will move by gravity from its elevated position to its lower loading position.

The hydraulic fluid is contained in a reservoir 60 which supplies all the hydraulic needs. A motor 61 drives a pump 62. The pump withdraws oil from the reservoir 60 through a conduit 63 and delivers it through a three-way valve 65 of a known type to a conduit 66 connected to the bottom of the cylinder 25, elevating the piston. This is the condition which prevails when the control lever 68 of the valve 65 is in the solid line position, FIG. 1. When the control lever 68 is shifted to the dotted line position 68A, FIG. 1, the valve is then effective to connect the conduit 66 to the reservoir 60, whereby the cylinder is drained, allowing the piston to drop by gravity. The pump may be run continuously, and when the valve 65 is effective to permit draining of the cylinder, fluid under pressure is excluded from delivery to conduit 66 by a check valve, not shown.

Positioning of lever 68 is controlled by the motion of a control rod 70, FIG. 1, which extends parallel to the support column 20, this position being maintained by a pair of spaced guides 71 and 72 respectively secured to the main support 20 at the upper and lower ends thereof, and these guides are apertured to allow vertical shifting of the rod 70. As shown in FIG. 1, a horizontal finger 73 is fixed to the lower ent of the rod 70 and a vertical link 74 is pivotally connected thereto. The link 74, in turn, is pivotally connected at its upper end to a rocker 75, and the upper end of the rocker is connected to the throw lever 68 of valve 65 by a link 76. Thus, when rod 70 is shifted upwardly as viewed in FIG. 1, the link connections to the valve control lever 68 will result in movement of the latter from the full line to the dotted line position 68A. Conversely, when rod 70 is shifted downward, the lever will move from the dotted line position 68A, to the full line position shown in FIG. 1.

The control rod 70 is in effect positioned to reverse the piston as an incident to the hopper 12 arriving at either the loading station or the unloading station. Thus, a control finger or striker 80, FIG. 1, is affixed to the slide 45 and projects rearwardly therefrom. A lug 81 is affixed to the control rod 70 and projects forwardly therefrom. An adjusting screw 83 extends upwardly from the fore end of the lug 81 into the path of the striker 80, and the arrangement is such that as the transfer hopper 12 attains the full line position shown in FIG. 1, the striker 80 engages the adjusting screw 83 resulting in downward movement of the control rod 70 and positioning of the valve lever 68 in the full line position shown in FIG. 1. Preferably a coil spring 84 surrounds the screw 83 to serve as a cushion.

A like control is established at the unloading position in that the rod 70 is provided at its upper end with a forwardly projecting finger 85 presenting a screw 86 engageable by the striker 80 in the course of the transfer hopper 12 arriving at the unloading station. Again, a coil spring 87 may be employed to cushion engagement between the striker and the screw. Thus, as an incident to the striker 80 attaining the dotted line position shown in FIG. 1, the control rod 70 is shifted upwardly resulting in reversal of the valve 65, allowing the bottom of the cylinder 25 to drain to the reservoir 60.

The loading hopper is trunnion mounted at the bottom, FIGS. 1 and 4, by means of pins or studs 30P supported at the upper ends of uprights as 30A, included as part of the table 30. When the loading hopper is in the position 15A, FIG. 1, materials are transferred thereto, such as a load of ball bearings moving downward in the loading chute 16. This represents an eccentric load in the hopper, tilting it counterclockwise until engaged with a stop 30B secured to the upright as 30A, FIG. 1. The loading hopper 15, FIG. 4, has a stud 15T projecting from one side, and in the fully loaded position, FIG. 1, this stud is disposed in the path of a trip finger 88F moving downward with the hopper 12 from the unloading station. The trip finger is presented at the forward end of a bracket 88 secured to the slide 45, FIG. 4. Further downward movement of the finger 88F from the intermediate dotted line position in FIG. 1 to the full line position results in forward tilting of the loading hopper to the full line position so that the materials contained therein discharge by gravity through an opening therein, into the transfer hopper.

This discharge of materials from the loading hopper to the transfer support occurs during several inches of downward travel of the transfer hopper, so that there is complete loading of the latter by the time the transfer hopper has fully attained or arrived at the loading station. An full arrival at the loading station, the striker finger 80 on the slide 45 engages the screw 83 manifest in reversal of the valve 65 so that fluid under pressure is directed through conduit 66 to the lower end of the cylinder 25 resulting in reversal or upward movement of the piston 35. Consequently, the chain 39 is tensioned to lift the slide 45 incidental to driving hopper 12 upward to the discharge station. At this time, a second trip finger 89 on the bracket 88 tilts the supply topper to the dotted line position, FIG. 1, for the next load.

The transfer support or hopper 12 is itself tilted at the unloading station to transfer materials contained therein to the discharge chute 18, FIG. 3. To this end, the hopper 12 is formed with a cam track 90. FIG. 5, and this cam track as shown in FIG. 4 is at the rear side of the hopper 12 outward of the main support column 20. An L-shaped bracket 91, FIG. 4, has the short leg thereof affixed to plate 20A, and the long leg of the bracket 91 projects outward of the support column 20. A support rod 92 is secured to and extends forwardly of the long leg of the bracket 91, FIG. 4, and carries a cam roller or follower 92R at the outer end thereof. The roller 92R occupies a fixed position and is disposed in the path of the cam track 90, the configuration being such that as the hopper 12 moves into the unloading station, the cam track 90 is presented to the roller 92R. As the hopper 12 continues upward movement for full arrival at the unloading station, the roller 92R and cam track 90 cooperate to tilt the hopper 12 through 90° as shown in FIG. 3, whereby the materials contained therein are discharged to the chute 18. Substantially simultaneously, the striker finger 80, in the dotted line position shown in FIG. 1, engages the screw supported by the lug 85 causing upward shifting of control rod 70, setting the valve 65 in position to communicate conduit 66 to the oil reservoir and resulting in reversal of downward movement of the piston 35 under the effect of gravity. As the transfer hopper is thus lowered by the chain 39 the hopper is of course in an empty condition ready to be filled in the course of arriving at the loading station, and when the transfer support is fully filled as an incident to assuming the final home position at the loading station, then of course valve 65 is reversed to institute movement of the transfer support in the opposite direction to the unloading station.

It will be seen from the foregoing that the present invention enables materials to be easily transferred from one station to another under fully automatic conditions in that both loading and unloading are automatic as well as reversal of the piston means which both elevates and lowers the transfer support between the stations.

Hence, while I have illustrated and described a preferred embodiment of my invention, it is to be understood that this is capable of variation and modification.

I claim:
1. Materials handling apparatus comprising an upright support, a slide mounted on the support for vertical up and down movement, a hopper carried by the slide for movement therewith between a lower filling position and an upper discharge position, means pivotally mounting said hopper to said slide, a loading member tiltably supported adjacent the bottom of the support, trip means mounted on said hopper and engageable with the loading member to discharge its contents into the hopper as the hopper attains its lower loading position, cam track means on the hopper, cam means disposed in the vertical path of the hopper and engageable with said track means to pivot the hopper about said pivot means as said hopper attains its upper discharge position whereby the contents of the hopper are discharged, a reversible piston in a hydraulic cylinder adjacent said support, means for supplying fluid under pressure to the cylinder to operate the piston, means connecting the piston to the slide so that the slide may be raised and lowered on the support by corresponding motion of the piston, and control means including a valve for controlling the flow of hydraulic fluid to and from the cylinder, said control means further including an elongated vertical continuous control rod, means mounting said rod on said upright and parallel thereto, linkage means connecting said control rod to said valve means, means on said control rod adjacent said hopper positions for reversing said valve as the hopper attains each of its positions, means on said slide and engageable with said actuating means to vertically shift said control rod, said cam means also being effective to restore the hopper to its normal attitude as it descends with the slide from its discharge to its loading position, and said trip means also being effective to restore said loading member to its normal position as the hopper moves upwardly from its loading position.

References Cited

UNITED STATES PATENTS

| | | | |
|---|---|---|---|
| 438,612 | 10/1890 | Dinsmore | 214—627 |
| 453,980 | 6/1891 | Matthews | 187—36 |
| 1,323,911 | 12/1919 | Reynolds | 187—36 |
| 1,370,226 | 3/1921 | Rosener | 214—707 |
| 1,732,232 | 10/1929 | Howlett | 214—127 X |
| 3,279,635 | 10/1966 | Avery et al. | 214—707 |

GERALD M. FORLENZA, Primary Examiner

RAYMOND B. JOHNSON, Assistant Examiner

U.S. Cl. X.R.

214—707